(12) United States Patent
Nedorezov et al.

(10) Patent No.: US 9,283,955 B2
(45) Date of Patent: Mar. 15, 2016

(54) METHOD AND APPARATUS FOR STARTING AN ENGINE OF A MODULAR HYBRID TRANSMISSION BASED UPON DEMANDED TORQUE

(75) Inventors: Felix Nedorezov, Rochester Hills, MI (US); Hong Jiang, Birmingham, MI (US); Matthew John Shelton, Grosse Ile, MI (US); Bernard D. Nefcy, Novi, MI (US); Daniel Scott Colvin, Farmington Hills, MI (US); Zhengyu Dai, Canton, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 899 days.

(21) Appl. No.: 13/465,358

(22) Filed: May 7, 2012

(65) Prior Publication Data

US 2013/0296109 A1  Nov. 7, 2013

(51) Int. Cl.
| | |
|---|---|
| *F02N 11/00* | (2006.01) |
| *B60W 20/00* | (2006.01) |
| *B60W 10/06* | (2006.01) |
| *B60W 10/08* | (2006.01) |
| *B60W 30/18* | (2012.01) |

(52) U.S. Cl.
CPC .............. *B60W 20/40* (2013.01); *B60W 10/06* (2013.01); *B60W 10/08* (2013.01); *B60W 30/18027* (2013.01); *F02N 11/006* (2013.01); *B60Y 2400/46* (2013.01); *Y02T 10/6286* (2013.01); *Y10T 477/26* (2015.01)

(58) Field of Classification Search
None
See application file for complete search history.

(56) References Cited

U.S. PATENT DOCUMENTS

| | | | | |
|---|---|---|---|---|
| 6,018,198 | A | * | 1/2000 | Tsuzuki ................. B60K 6/365 180/65.25 |
| 7,276,008 | B2 | | 10/2007 | Yasui et al. |
| 7,766,792 | B2 | | 8/2010 | Lee et al. |
| 7,785,229 | B2 | | 8/2010 | Maddock |
| 8,565,990 | B2 | | 10/2013 | Ortmann et al. |
| 2004/0055800 | A1 | * | 3/2004 | Katou ..................... B60K 6/26 180/65.26 |
| 2009/0321157 | A1 | | 12/2009 | Sowul et al. |
| 2011/0203272 | A1 | | 8/2011 | Nedorezov et al. |

* cited by examiner

*Primary Examiner* — Erin D Bishop
(74) *Attorney, Agent, or Firm* — James Dottavio; Brooks Kushman P.C.

(57) ABSTRACT

A control system including a method and apparatus for operating a hybrid vehicle. A disconnect clutch selectively separates an electric machine from a combustion engine. If a wide open throttle or high torque command is requested and the combustion engine is shut down, a 12 volt starter may be used to start the combustion engine while disconnected from the electric machine and all of the electric machine torque available may be used for traction.

10 Claims, 4 Drawing Sheets

METHOD AND APPARATUS FOR STARTING AN ENGINE OF A MODULAR HYBRID TRANSMISSION BASED UPON DEMANDED TORQUE

TECHNICAL FIELD

This disclosure relates to vehicles that have a combustion engine and an electric traction motor that cooperate to provide torque to drive the vehicle and to a control algorithm for starting the engine with either a starter motor or the electric traction motor.

BACKGROUND

Vehicle manufacturers are developing hybrid vehicles to meet the demand for more fuel efficient vehicles. One configuration for a hybrid vehicle may be referred to as a Modular Hybrid Transmission (MHT) vehicle design. In a MHT vehicle, an electric machine is sandwiched between conventional automatic step ratio transmission and the engine. The electric machine is attached to the transmission impeller or input shaft. The engine is selectively disconnected from the transmission using special "disconnect clutch". The disconnect clutch allows vehicle to be driven under electric power alone, in hybrid mode with both electric machine and the engine propelling the vehicle, or in a combustion engine only mode where vehicle is propelled by the engine only.

Better fuel economy engine may be achieved by shutting down the engine when vehicle is decelerating and restarted when the driver depresses the accelerator pedal, or "tips in." The engine may be disconnected from transmission and regenerative braking can be initiated when the brakes are applied to capture vehicle kinetic energy.

One problem with MHT vehicles is that the electric machine may not be able to provide the requested additional torque without the engine. For example, when the driver demands a large increase in torque (or in extreme cases the driver demands wide open throttle) in the middle of regenerative braking or when the vehicle was stopped with the engine shut down and disconnected, the engine has to be restarted quickly to provide adequate torque to meet the driver's demand for torque.

The engine is normally started by the electric machine with the disconnect clutch applied. Starting the engine with electric machine requires a certain portion of the electric machine torque to be used for the engine restart further slowing or delaying vehicle launch.

This disclosure is directed to solving the above problem and other problems associated with hybrid vehicles as summarized below.

SUMMARY

The engine of a vehicle having an MHT configuration is typically started by applying disconnect clutch and connecting the engine to the electric machine. MHT vehicles are also equipped by 12V starter that is quite often used if the high voltage battery is depleted or ambient temperature is very low limiting operation of the high voltage battery or when the electric drive is otherwise not operational. The starter is rarely used outside of these conditions for engine starts.

The electric machine is normally used to start the engine because one of the limitations of the MHT configured vehicle is the durability of the starter motor. It is expected that the engine will experience more than one million starts over the life of the hybrid vehicle. Regular starters have expected life of 100,000 cycles and enhanced starters (specifically designed for Stop/Start systems) have expected life of 300,000. Restarting the engine requires significant torque that is not available for vehicle propulsion. Starting the engine and engaging the disconnect clutch to its full torque capacity can take 600 to 900 msec. depending on the type of engine. Restarting the engine is particularly troublesome when the driver demands high acceleration by doing hard tip-in and the engine is shut down with the disconnect clutch disconnected.

In this disclosure, the vehicle controller receives an input signal from the accelerator pedal and calculates a driver demand torque. If the driver demand torque exceeds certain calibrated threshold torque all of the electric machine torque will be used to propel the vehicle. The engine may then be restarted using 12V starter. The engine speed is increased and commanded to match electric machine speed. The disconnect clutch is applied when the speed of the engine is within a calibrated range relative to the speed of the e-machine.

Optimal propulsion torque is provided by the vehicle in the hybrid mode with both the electric machine and the combustion engine operating. If the driver demand torque is below the threshold when the engine is to be restarted, the e-machine is used to restart the engine. The durability of the starter is not a concern because the 12 volt starter is used to restart the engine only when there is a high driver demand for torque (eg. wide open throttle demanded).

According to one aspect of this disclosure, a hybrid vehicle driveline apparatus is provided that maximizes the torque available to provide traction from the motor while starting the engine when a there is a request for additional torque and the engine is stopped. The apparatus includes an engine that may be stopped to increase fuel economy. The engine has a starter that provides torque to start the engine independently of the electric machine. A stepped gear ratio automatic transmission and a motor are operatively connected between the engine and the transmission. The motor is selectively connected to the engine by a clutch. A torque demand request apparatus is adapted to provide a torque demand request signal. A controller receives the torque demand request signal and provides either an engine start signal to the starter when the engine is stopped and the torque demand request signal is greater than a predetermined value or to the motor when the engine is stopped, the clutch is applied, and the torque demand request signal is less than or equal to the predetermined value.

According to other aspects of this disclosure, the torque command request apparatus may be an accelerator pedal that includes a pedal position sensor that provides a pedal position signal to the controller. The apparatus may further comprise a motor speed signal and an engine speed signal provided to the controller that applies the clutch when the motor speed signal and the engine speed signal are within a calibrated threshold difference. The motor speed signal and the engine speed signal may be monitored by the controller after the clutch is applied and the controller increases the pressure applied by the clutch to lock-up the clutch. The controller may send a maximum torque application signal to the motor before the starter motor is actuated.

According to another aspect of this disclosure a method is disclosed for operating a vehicle having a motor between a transmission and an engine. The motor and the engine may be connected through a clutch that selectively connects the motor and the engine. The vehicle may have an accelerator pedal including a pedal position sensor that provides a pedal position signal. The pedal position signal is provided to a controller when the motor is operating and the engine is stopped. A starter motor is provided to start the engine when the pedal position signal is greater than a threshold. Engine speed is increased to within a calculated range of speed relative to the motor and the clutch is applied when the engine speed is within the calculated range.

According to other aspects of the disclosed method, the pedal position signal is provided to the controller when the pedal position exceeds a threshold minimum value. The method may further comprise obtaining a motor speed signal, an engine speed signal, and applying the clutch when the motor speed signal and the engine speed signal are within a calibrated threshold difference of each other. The motor speed signal and the engine speed signal are monitored after the clutch is applied and the pressure applied by the clutch is increased to lock-up the clutch. A maximum torque application signal is provided to the motor before the starter motor is actuated.

According to another aspect of this disclosure, a system is disclosed for starting an engine of a vehicle that has a motor that is selectively coupled to the engine by a clutch. The system comprises an engine control module, a pedal position sensor that provides a pedal position signal to an engine control module, and a starter motor actuated by the engine control module based upon the pedal position signal. The engine control module sends a clutch apply signal to the clutch to apply the clutch when the engine speed is within a predetermined range of the motor speed.

The pedal position sensor may provide the pedal position signal to the engine control module when the pedal position exceeds a threshold minimum value. A motor speed signal and an engine speed signal are compared to each other and the clutch is applied when the motor speed signal and the engine speed signal are within a calibrated threshold difference. The motor speed signal and the engine speed signal may be monitored after the clutch is applied and the pressure applied by the clutch is increased to lock-up the clutch. The engine control module may send a maximum torque application signal to the motor before the starter motor is actuated.

The above aspects of this disclosure and other aspects will be better understood in view of the attached drawings and the following detailed description of the illustrated embodiments of the disclosure.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1A:
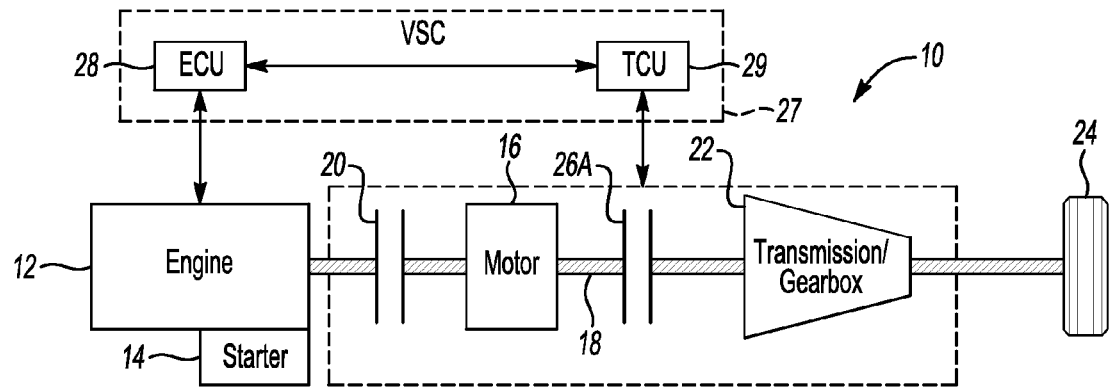
FIG. 1A is a diagrammatic view of a modular hybrid transmission system for a hybrid vehicle that does not include a torque converter.
Figure 1B:
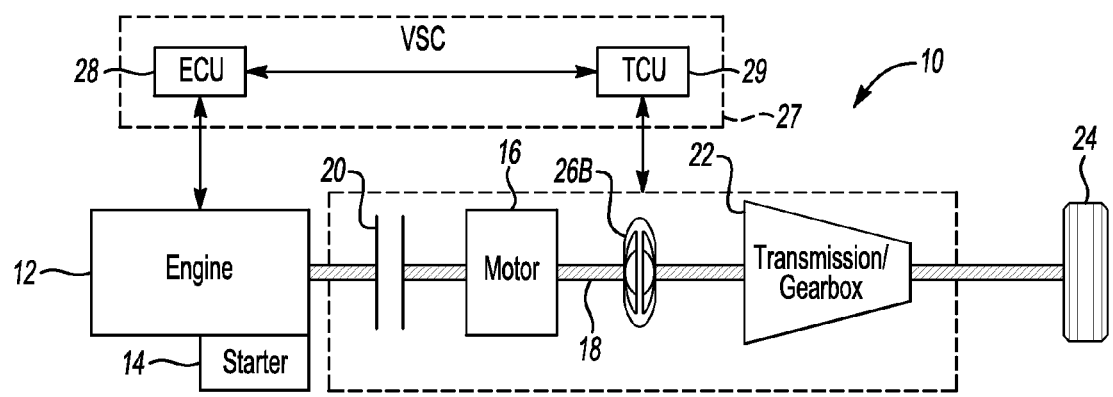
FIG. 1B is a diagrammatic view of an alternative embodiment of a modular hybrid transmission system for a hybrid vehicle that includes a torque converter.

Referring to FIGS. 1A and 1B, a modular hybrid transmission 10 is shown in a diagrammatic form. An engine 12 is operatively connected to a starter 14 that is used to start the engine 12 when additional torque is needed. A motor 16, or electric machine, is operatively connected to a driveline 18. A disconnect clutch 20 is provided on the driveline 18 between the engine 12 and the electric machine 16. A step shift geared automatic transmission 22, or gear box, is also provided on the driveline 18. Torque transmitted from the engine 12 and motor 16 is provided through the driveline 18 to the transmission 22 that provides torque to the wheels 24. As shown in FIG. 1A, launch clutch 26A is provided between the transmission 22 and the engine 12 and/or motor 16 to provide torque through the transmission 22 to the wheels 24. As shown in FIG. 1B, a torque converter 26B is provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle includes a vehicle system control (VSC) for controlling various vehicle systems and subsystems and is generally represented by block 27 in FIG. 1. The VSC 27 includes a plurality of interrelated algorithms which are distributed amongst a plurality of controllers within the vehicle. For example, the algorithms for controlling the MHT powertrain are distributed between an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 and TCU 29 communicate with each other and other controllers (not shown) over a hardline vehicle connection using a common bus protocol (e.g., CAN), according to one or more embodiments. Although the illustrated embodiment depicts the VSC 27 functionality for controlling the MHT powertrain as being contained within two controllers (ECU 28 and TCU 29) other embodiments of the HEV include a single VSC controller or more than two controllers for controlling the MHT powertrain.

Figure 2:
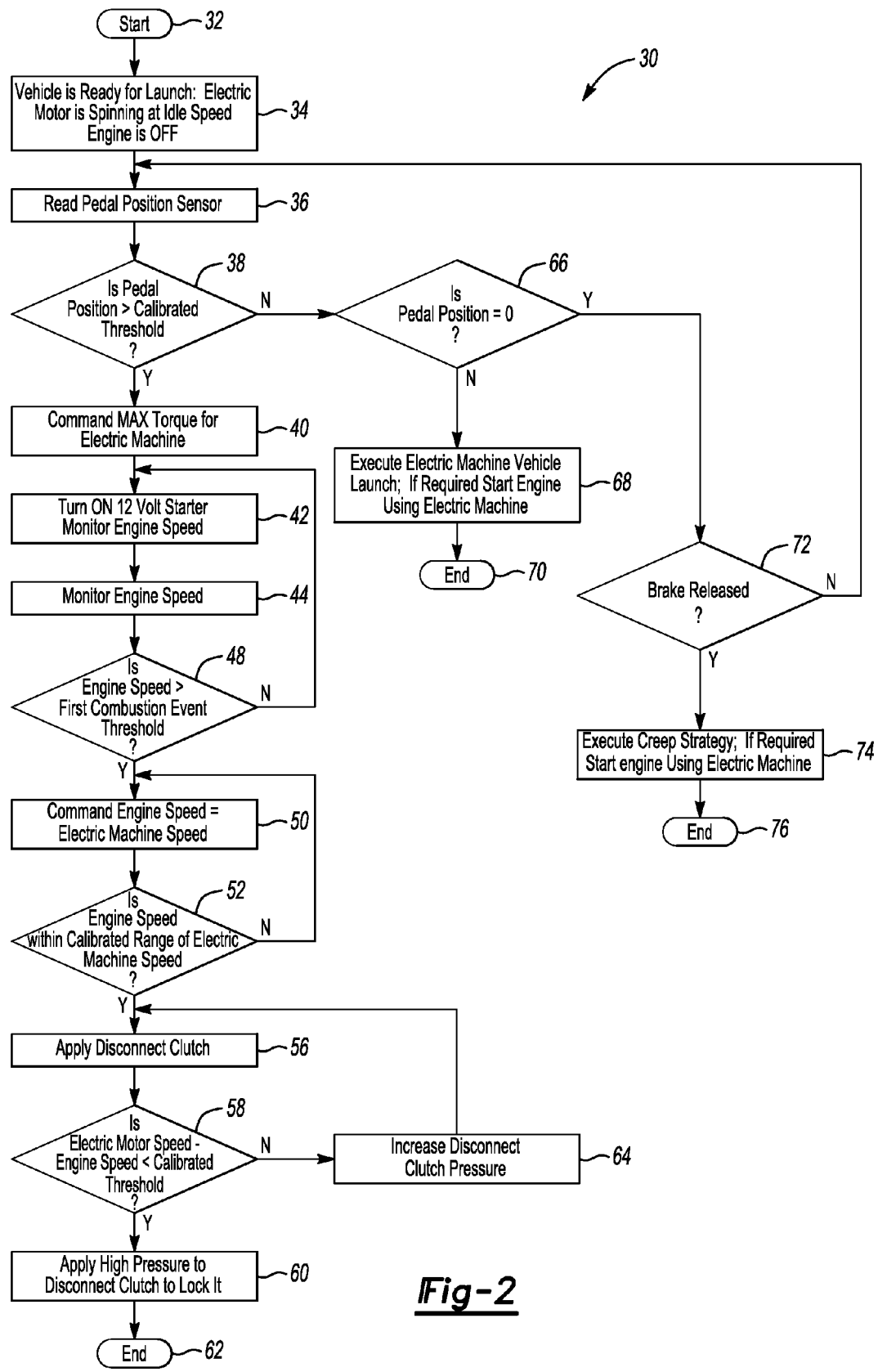
FIG. 2 is a flowchart of an algorithm for controlling a starter for a combustion engine or an electric machine depending upon the torque demanded.

Referring to FIG. 2, the algorithm disclosed for operating the vehicle 10 in one embodiment is illustrated by the flowchart 30. The algorithm begins at start 32. The vehicle is ready for launch, at 34, with the electric motor 16 spinning at idle speed and the combustion engine 14 off. A pedal position sensor is read, at 36. The pedal position sensor provides a pedal position signal. The pedal position signal is analyzed, at 38, to determine whether the pedal position signal is greater than the calibrated threshold signal. If the pedal position is requesting more torque than the calculated threshold, at 38, the controller commands that maximum torque be provided to the electric machine, at 40. The electric machine 16 provides torque as rapidly as possible without requiring that a portion of the torque from the electric machine 16 be used to start the combustion engine. The 12 volt starter is turned on, at 42, to start the engine 12.

Engine speed is monitored, at 44, by an engine speed sensor. It is determined whether the engine speed is greater than the first combustion event threshold, at 48. If so, the command engine speed is set to equal the electric machine speed, at 50. At 52, it is determined whether the engine speed is within the calibrated range of the electric machine speed. Generally, it is preferred that the engine speed be within a limited range of matching the electric machine speed. Upon matching speeds, at 52, the disconnect clutch is applied, at 56, thereby connecting the combustion engine 14 to the driveline 18. At 58, it is determined whether the absolute value of the difference between the electric machine speed and the engine speed is less than a calibrated threshold. If so, pressure is applied to lock the disconnect clutch, at 60. The algorithm is completed, at 62.

If the absolute value of the difference between the electric machine speed and the engine speed is determined to be equal to or greater than the calibrated threshold, the system increases disconnect clutch pressure applied at 64 incrementing the clutch pressure in a loop until the absolute value of the difference between the electric motor speed and engine speed is less than the calibrated threshold, at 58.

If the pedal position is not greater than the calculated threshold, at 38, the system determines whether the pedal position is equal to zero indicating that the driver is not requesting torque as indicated by the driver not depressing the accelerator pedal, at 66. If the pedal position is not at zero, the electric machine vehicle launch is executed and the combustion engine 14 may be started using the electric machine torque output to start the engine, at 68. The brake is released as the accelerator pedal is depressed. Under this condition, the algorithm ends, at 70. If the pedal position at 66 is equal to zero, the system determines whether the brake is released, at 72. If the brake is released, the controller executes a creep strategy launching the electric machine with a gradually increasing torque output. Again, if required, the engine 14 may be started using the electric machine 16, at 74, and the algorithm under these conditions concludes, at 76.

Figure 3:
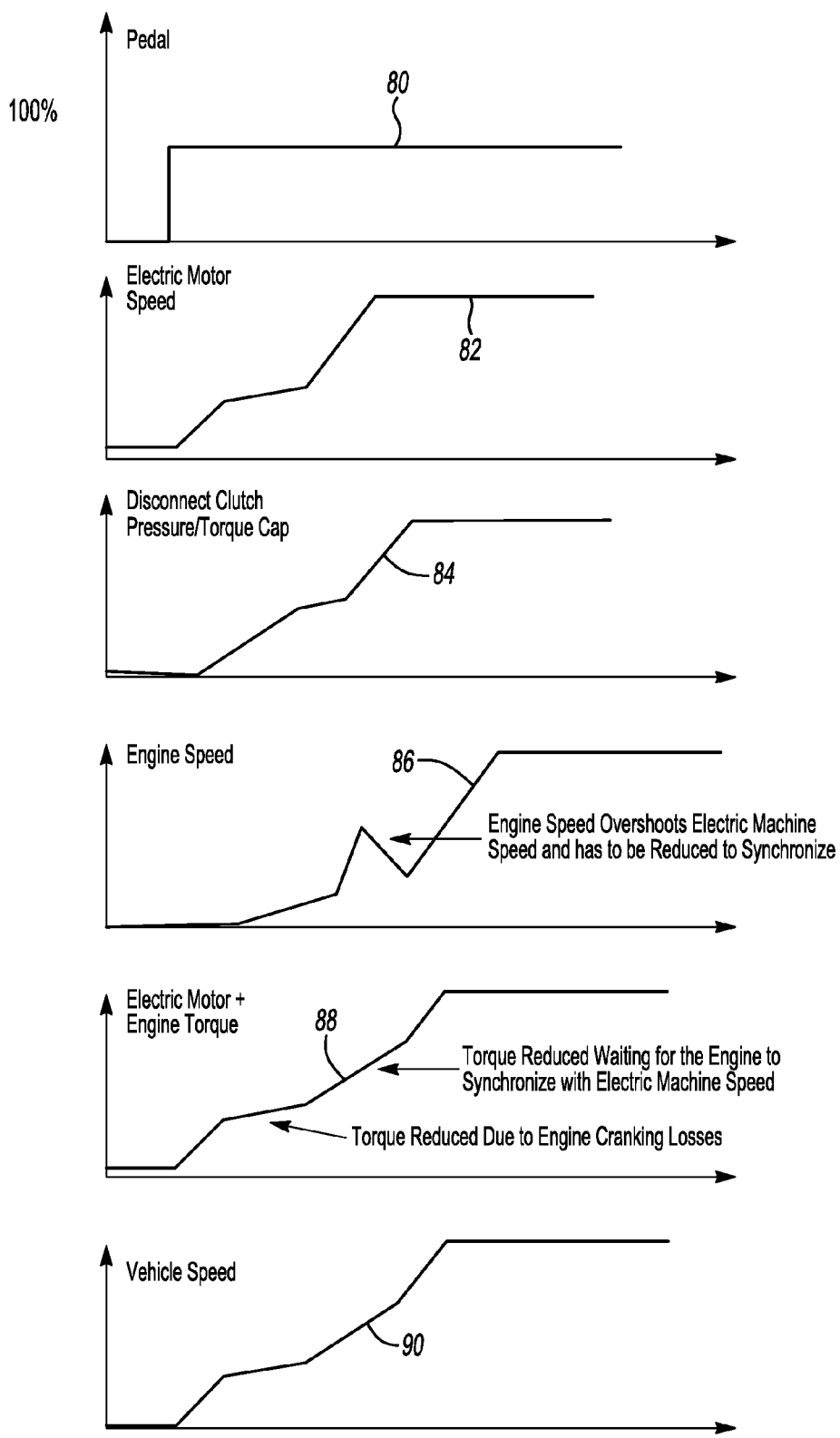
FIG. 3 is a graphical representation of several vehicle operating parameters as impacted by an engine start procedure using the electric machine.

Referring to FIG. 3, starting the combustion engine 14 using an electric machine is illustrated in several synchronous charts of engine operating parameters. The pedal position is illustrated by the line 80. Initially, the pedal is not depressed, but is then fully depressed to a wide open throttle or 100% condition. The pedal position line represents the driver torque demand. The engine motor speed line 82 is initially at a relatively low level, but upon depression of the accelerator pedal, the electric motor speed increases to its maximum speed.

At the same time, the disconnect clutch pressure, which may also be understood as the torque capacity line is illustrated by the line 84, and is initially zero and then gradually increases as the electric motor speed increases to a maximum disconnect clutch pressure shown by line 84. The engine speed represented by line 86 is initially zero, and after a period of delay measured from the time at which the pedal is fully depressed, the engine speed slowly begins to increase. As shown, the engine speed may actually over-shoot the electric motor speed and may require a reduction in speed to achieve synchronization with the electric motor speed. The torque required to start the engine reduces the rate of increase of the electric motor speed shown by line 82. The electric machine and engine torque is illustrated by line 88 to be initially at a relatively low level. The combined torque is reduced initially due to torque losses caused by engine cranking. The combined torque is also reduced as a result of the need to allow the engine speed to be synchronized with the electric machine speed. Finally, vehicle speed is initially zero or relatively low and then increases following the general increase in total torque, as shown by line 90.

Figure 4:
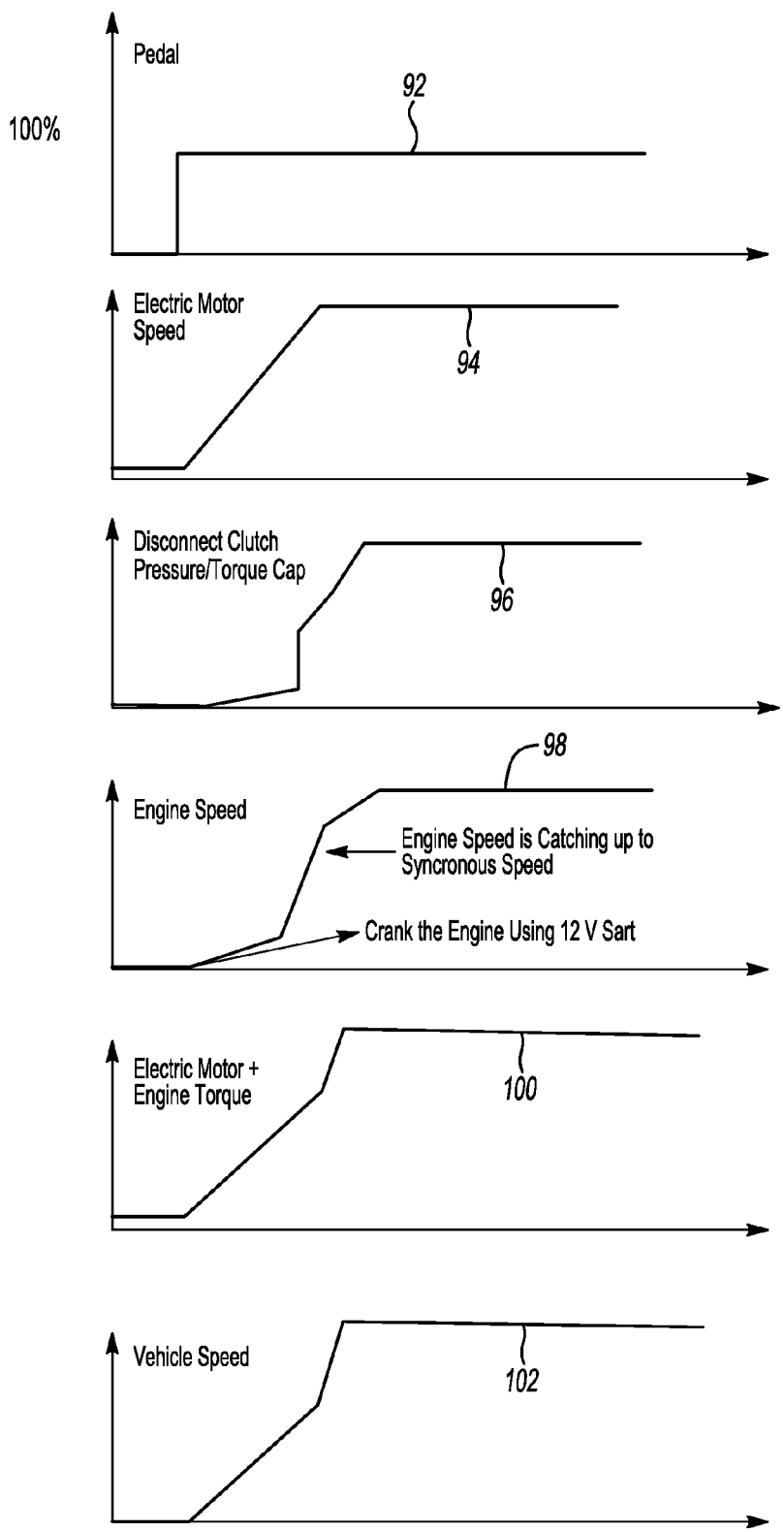
FIG. 4 is a graphical representation of several vehicle operating parameters as impacted by an engine start procedure using the engine starter.

Referring to FIG. 4, the engine start procedure using the 12 volt starter is shown in a series of graphs similar to those shown in FIG. 3 to illustrate the greater responsiveness in torque output when the engine is started using the 12 volt starter instead of the electric machine. The pedal position is shown by line 92, which shows that the identical command is provided as in FIG. 3 by compressing the pedal from zero to wide open throttle. Electric motor speed, shown by line 34, is initially a relatively low rate of speed that is constantly increased to a maximum speed. The disconnect clutch pressure, or torque capacity, is shown by line 96. The disconnect clutch is not initially engaged but then begins to increase as the engine begins to crank. When the engine speed begins to catch up to the synchronous speed, as shown by line 98, the disconnect clutch pressure increases rapidly to a maximum level. The combined electric machine and engine torque is illustrated by line 100. Line 100 begins with a low level of torque flowing from the electric motor. As the disconnect clutch 20 gains torque capacity, engine torque is added to the electric machine torque to a maximum illustrated by line 100. The vehicle speed, illustrated by line 102, is initially shown to be zero with a constant increase in speed that is increased at a more rapid rate as the engine speed increases to the maximum as illustrated by line 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    an engine having a starter;
    a stepped gear ratio automatic transmission operatively connected to the engine by a clutch;
    a motor operatively connected to the transmission; and
    a controller that provides an engine start signal when the engine is stopped to:
        the starter when a torque demand request signal exceeds a threshold, and to the motor when the clutch is applied and the torque demand request signal does not exceed the threshold.

2. The vehicle of claim 1 further comprising an accelerator pedal that includes a pedal position sensor that provides a pedal position signal to the controller.

3. The vehicle of claim 1 wherein the controller applies the clutch when motor speed and engine speed are within a calibrated threshold difference.

4. The vehicle of claim 3 wherein the motor speed and the engine speed are monitored by the controller after the clutch is applied, and wherein the controller increases a pressure applied by the clutch to lock-up the clutch.

5. The vehicle of claim 1 wherein the controller sends a maximum torque application signal to the motor before the starter motor is actuated.

6. A method of operating a vehicle having a motor between a stepped gear ratio automatic transmission and an engine, the motor and the engine being connected through a clutch that selectively connects the motor and the engine, the method comprising:
    actuating a starter to start the engine when a torque demand request signal is greater than a threshold; and
    actuating the motor to start the engine when the clutch is applied and the torque demand request signal does not exceed the threshold.

7. The method of claim 6 further comprising providing a pedal position signal to the controller.

8. The method of claim 6 further comprising:
applying the clutch when motor speed and engine speed are within a calibrated threshold difference.

9. The method of claim 8 further comprising increasing a pressure applied by the clutch after the clutch is applied to lock-up the clutch.

10. The method of claim 6 further comprising sending a maximum torque application signal to the motor before the starter motor is actuated.

* * * * *